DATA CODER AND INPUT DEVICE

Filed Oct. 28, 1966 2 Sheets-Sheet 1

INVENTOR.
ERNEST E. GILBERT
BY Rines and Rines
ATTORNEYS

INVENTOR.
ERNEST E. GILBERT
BY Rines and Rines
ATTORNEYS

United States Patent Office 3,347,986

Patented Oct. 17, 1967

3,347,986

DATA CODER AND INPUT DEVICE

Ernest E. Gilbert, Garden Grove, Calif., assignor to Bolt Beranek and Newman, Inc., Cambridge, Mass.

Filed Oct. 28, 1966, Ser. No. 590,430

3 Claims. (Cl. 178—18)

ABSTRACT OF THE DISCLOSURE

X-Y encoding apparatus in which the position of a cursor along orthogonal coordinates of a table is converted into code signals by code cards, one of which is fixed along a side of the table and has movable brushes supported on an end of a movable cursor-supporting track, and the other of which is fixed along an end of the table and has movable brushes coupled to the cursor by cables. Additional cables interconnect the ends of the track for stability and drive a drum which controls slack in electrical leads trailing from the cursor.

This application is a continuation-in-part of Ser. No. 538,843, filed Mar. 30, 1966 for Data Coder and Input Device.

The present invention relates to data input devices and more particularly to apparatus for producing a coded representation of any selected element of a matrix.

In the art of information storage and retrieval code signals may be produced representing information in a data store, or more particularly the location of the stored information. For example, the signals may be produced by employing a two-dimensional matrix, any selected element of which is represented by the values of two coordinates, which may be specified in digital code.

While theoretically the production of code signals representing the position of a point in a matrix plane is a simple matter, in practice the devices for accomplishing such functions have left much to be desired. A conventional X-Y plotter may be converted to reverse its normal functions, but the conversion requires complex digital shaft encoders or potentiometers combined with analog-to-digital conversion circuits. Wholly analog devices cannot produce output signals usable with conventional digital equipment, such as teletypewriters or computers.

In certain proposed devices a stylus is supported for movement along a bar which in turn is supported for movement orthogonally along a platform, so that the stylus may be moved along two orthogonal coordinates of the platform to any selected point. The coordinates of the position of the stylus on the platform are encoded by digital code cards, one positioned along a side of the platform and cooperating with contacts movable with the bar along the platform, and another positioned along the bar and cooperating with contacts movable with the stylus along the bar. The arrangement is somewhat unwieldy and inaccurate, however, because of the need for providing a movable code card and because of the difficulties of ensuring precise correspondence between the position of the stylus and the supposedly corresponding positions of the contacts upon the cards.

It is accordingly a principal object of the present invention to provide improved data coder apparatus which overcomes the foregoing disadvantages of prior apparatus and which, to the contrary, in accurate, simple, and relatively inexpensive.

More particularly, it is an object of the invention to provide improved apparatus for generating signals representing the position of a selected point of a two-dimensional display and for ensuring that the coded signals accurately represent the coordinates of the selected point.

The foregoing and other objects, advantages, and features of the invention, and the manner in which the same are accomplished, will become more readily apparent upon consideration of the following detailed description of the invention taken in conjunction with the accompanying drawings, which illustrate a preferred and exemplary embodiment, and wherein.

Figure 1:
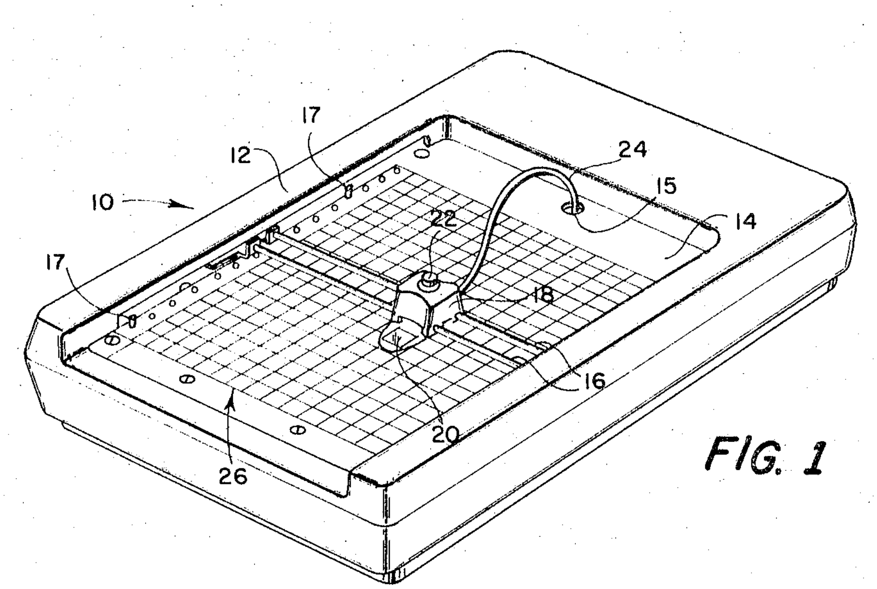
FIGURE 1 is a perspective view of data coder apparatus in accordance with the invention.

Referring to FIGURE 1 of the drawings, a data coder 10 of the invention has a protective case 12 which conceals a portion of the apparatus but which exposes a table 14. The table is preferably a translucent plate that can be illuminated from below, to project an image of a data matrix thereon, or as shown in FIGURE 1, can be provided with a paper chart or other two-dimensional matrix 26 positively located thereon by means of positioning pins 17. Further reference to the matrix will be made later in connection with FIGURE 5.

A track or carriage comprising parallel traveling rails 16 is supported for movement over the table and supports a cursor 18. As will be seen hereinafter, the rails move perpendicularly to their length along one coordinate (e.g., length) of the table, and the cursor moves upon the rails along an orthogonal coordinate (e.g., width) of the table. The cursor is provided with a window 20 or other indexing device to permit precise positioning over any selected element of the two-dimensional matrix. The cursor may also have a push-button switch 22 connected to a trailing electrical lead 24 to initiate read-out after the position of the cursor has been selected.

Figure 2:
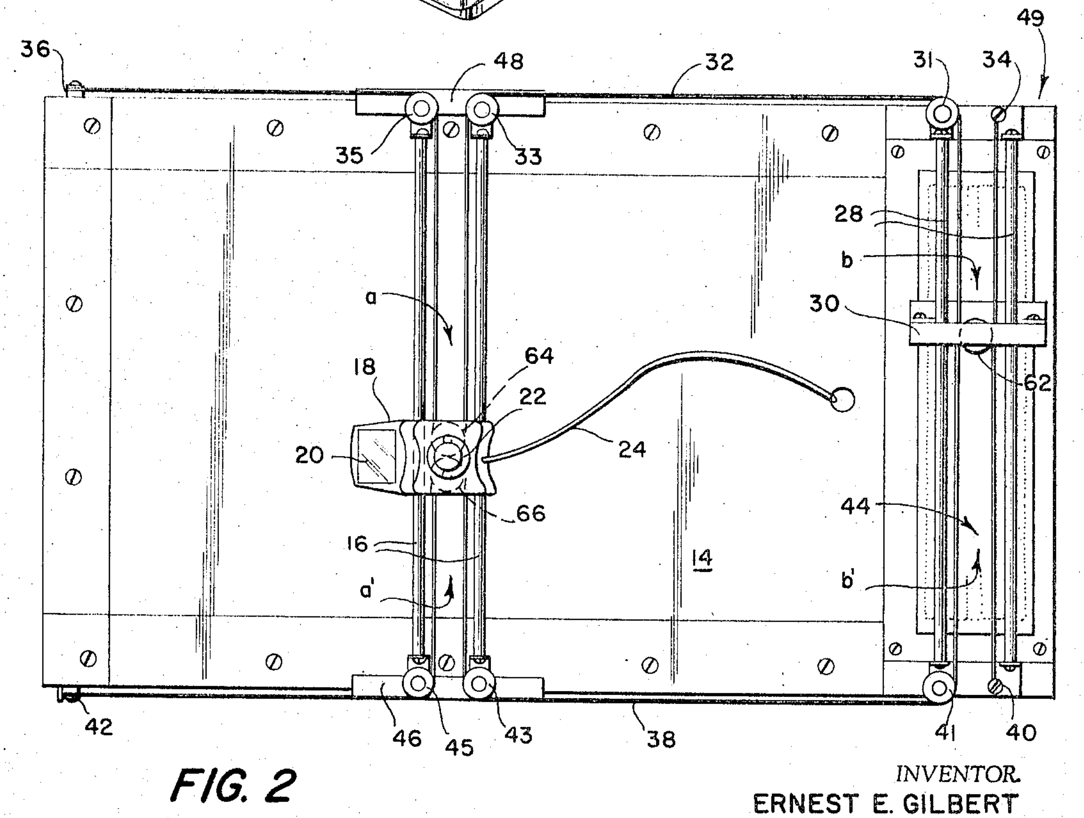
FIGURE 2 is a top plan view of the apparatus of the invention with the case removed.
Figures 3, 4:
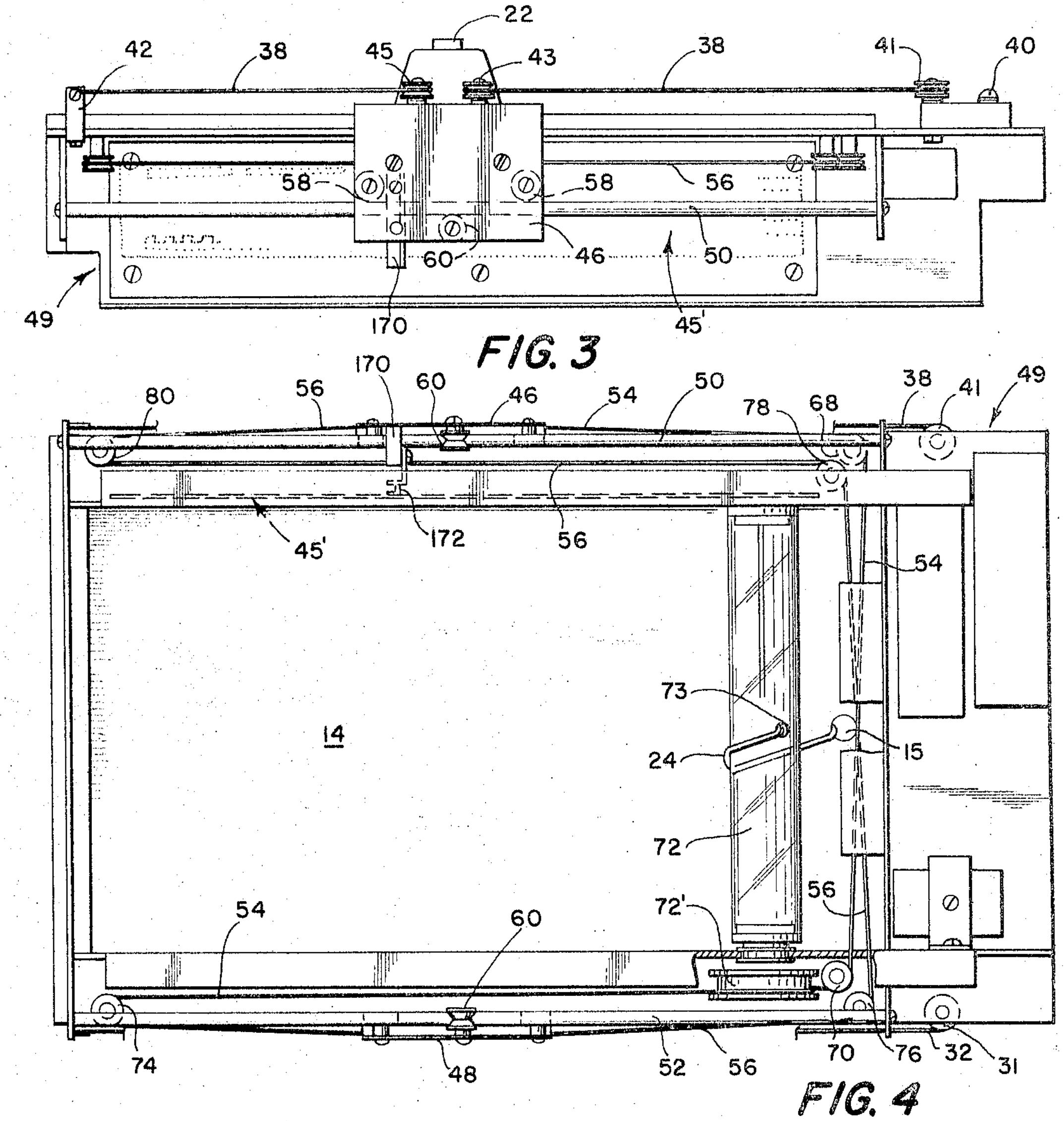
FIGURE 3 is similarly a side elevation view.
FIGURE 4 is similarly a bottom plan view.

As shown in FIGURES 2–4, opposite ends of the rails 16 are mounted upon trucks 46 and 48, respectively, which ride upon parallel cylindrical side rails 50 and 52. The side rails are fixed to the frame 49 of the apparatus and are located at the sides of the table 14. Each truck has a pair of bogey wheels 58, which ride on top of the rail 50 and 52, and each has a V-groove roller 60 mounted beneath the rail and located approximately midway between the bogey wheels 58.

The cursor 18 has parallel bores which receive and fit the traveling rails 16, so that the cursor may be moved precisely to any position along the traveling rails. The trucks are interconnected by cables 54 and 56 (FIGURE 4) to ensure constant orientation of the traveling rails and also to provide a drive dependent upon the movement of the traveling rails along the table.

The route of the cables may be traced in FIGURE 4. Cable 54 is fixed to truck 48, extends along one side of the table, then reversely about a pulley 74 mounted on frame 49 at an end (the front) of the table, along the said side of the table and around a similar pulley 70 at the opposite end (the rear) of the table, then across the bottom of the table and around similar pulley 68, and along the opposite side of the table to the truck 46, where the cable is fixed. Cable 56 follows a similar path, being fixed to the truck 46, extending reversely about pulley 80, then around pulley 78 and across the table to pulley 76 (crossing over cable 54) and then to truck 48, where the cable is fixed.

Cable 54 drives a hollow drum 72 which is rotatably supported transversely beneath the table. One end of the drum is provided with a pulley 72′ about which cable 54 is wrapped to provide a drive connection with the drum. Lead wire 24 trailing from the cursor 18 passes through an aperture 15 in the table and is wound upon the drum 72. The lead wire then extends through an aperture 73 in the drum and extends axially through the drum, passing out one end of the drum to a suitable electrical terminal.

When the traveling rails are moved along the table, the drum 72 is rotated to extend or retract the lead wire 24 as needed. Some slack is left in the lead wire at all times to ensure that the cursor may be moved to the extremities of the matrix upon the table without being restricted by the lead wire, yet sufficient slack is taken up by the drum when the cursor moves along the table toward the drum to ensure that the trailing lead does not present a problem.

To encode the position of the cursor 18 relative to the matrix 26 a pair of code plates or cards 44 and 45′ is provided. Code card 44 is positioned at one end of the table facing upwardly, while code card 45′ is positioned along one side of the table facing sidewardly. Each code card, as is well known in the art, may comprise conductive areas arranged on a nonconductive base (as by printed circuit techniques), the arrangement being chosen to represent a suitable digital code, such as a reflected binary or Gray code. The conductive areas define a series of parallel bit lines as is well known in the art.

Truck 46 carries a brush block or slider 170 having brushes 172 arranged to contact corresponding conductive areas of the code pattern representing the different digits of the code. The brushes may be connected together so as to provide electrical energy to selective conductive code areas of the pattern from a brush which continuously engages a common conductive area of the pattern. Thus the position of the brush block 170 along the code card 45′ will determine which conductive lines will receive electric energy.

Similarly, code card 44 has cooperating brushes supported upon a brush block or slider 30 which, in the manner of cursor 18, travels along rails 28 fixed at one end of the table in parallelism with the rails 16. The cooperation of the brushes of block 30 with the elements of the code pattern upon card 44 is essentially the same as previously described.

The positioning of the brush block 170 along code card 45′ in response to movement of the rails 16 is apparent from the foregoing description. It now remains to describe the manner in which the position of the cursor 18 along the rails 16 is transmitted to the brush block 30.

A cable 32 has one end fixed to frame 49 at 34 adjacent to one corner of the table and then extends transversely of the table and reversely around a pulley or cable guide 62 supported upon brush block 30, around a pulley 31 supported on the frame, along a side of the table, around a pulley 33 supported upon truck 48, then transversely of the table and reversely around a pulley 64 supported upon the cursor 18, around another pulley, 35, supported on truck 48, and along the side of the table to another corner thereof, where the cable is fixed at 36.

Similarly, cable 38 has one end fixed at 40 to the frame, extends reversely around pulley 62, then around pulley 41 supported on the frame, extends along a side of the table and around a pulley 43 supported on truck 46, then reversely around another pulley 66 supported on the cursor 18, and around a further pulley 45 supported on truck 46 to another corner of the table, where the cable is fixed at 42. Both cables 32 and 38 may be trained about the same pulley, 62, on the brush block 30, but around opposite sides thereof and at slightly different levels. The cursor has a pair of pulleys 64 and 66, as already noted.

It will be observed that each of the cables 32 and 38 defines a pair of lateral excursions or pockets, one being associated with the cursor and the other with the brush block 30. The pockets of the cable 32 are designated *a* and *b*, while the pockets of the cable 38 are designated *a′* and *b′*.

From FIGURE 2 it is apparent that if the cursor is moved along rails 16 so as to contract pocket *a* and expand pocket *a′* (that is, the cursor is moved toward the truck 48) pocket *b* will expand while pocket *b′* will contract. Thus, the pockets of the same cable expand and contract in opposition to each other and the corresponding pockets of the respective cables expand and contract in opposition. Movement of cursor 18 toward truck 48 causes brush block 30 to move toward point 40, while movement of cursor 18 toward truck 46 causes brush block 30 to move toward point 34. While the brush block moves in a direction opposite to the cursor, the position of the brush block upon the code card 44 represents the position of the cursor upon the rails 16, the code pattern of card 44 being oriented to accommodate the opposite movement of cursor and brush block.

Movement of the traveling rails 16 along the table toward or away from rails 28 does not affect the position of brush block 30 (unless, of course, the cursor is also moved along the rails 16). The length of the portions of cables 32 and 38 along the sides of the table at opposite sides of the rails merely increases or decreases to accommodate the movement of the rails 16. The pockets *a* and *a′* merely move along the table without change in size.

Figure 5:
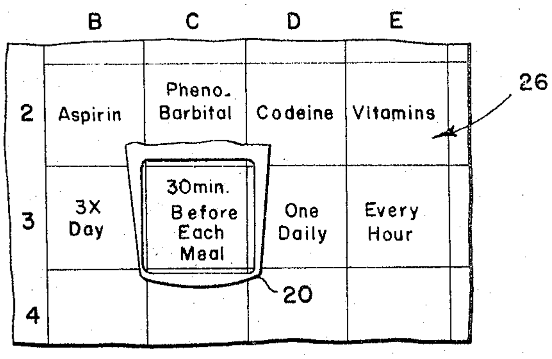
FIGURE 5 is a fragmentary top plan view illustrating the use of the apparatus with a typical matrix chart or display.

FIGURE 5 shows a portion of a typical matrix chart with the cursor window 20 aligned with a corresponding rectangle of the chart. The illustrative matrix is useful for preparing patient orders at a hospital. For example, in a first row there are medicaments, such as "aspirin," "phenobarbital," "codeine," "vitamins," etc., respectively listed in columns B, C, D and E. Similarly, a following row includes a selection of recommended dosages such as "three times daily," "thirty minutes before each meal," "once daily," "every hour," in columns B through E, respectively.

A typical order sequence might include, first, a selection of "vitamins" at row 2, column E, and next, a dosage of "thirty minutes before each meal," as in row 3, column C. Other rows could provide additional information relative to a medical order. A computer may be used to assemble and print-out a message including the information stored in computer memory locations corresponding to the selected matrix coordinates such as 2E and 3C in the example above. The address of the information to be printed is signalled to the computer as binary code characters representing the matrix coordinates. Pressing the push-button 22 of the cursor after the cursor window has been aligned with a selected rectangle of the matrix energizes the code cards from a suitable electric supply and provides read-out signals from the digit lines engaged by the corresponding brushes. Read-out from the cards 44 and 45′ may be sequential, as set forth in the foregoing copending application.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalents of the claims are to be included therein.

The invention claimed is:

1. Data encoding apparatus comprising cursor means supported for reciprocative movement along a predetermined coordinate of an information display, code producing means separated from said cursor means and having a fixed part and a movable part arranged to reciprocate with espect to said fixed part, and means coupling said movable part to said cursor means for responsive movement, said coupling means comprising cable means defining a pair of lateral pockets, one of said pockets being coupled to said cursor means and the other of said pockets being coupled to said movable part, and means for causing said one pocket to expand when said cursor means is moved in a predetermined direction and causing said other pocket to contract and move said movable part in a predetermined direction.

2. The apparatus of claim 1, said coupling means further comprising additional cable means defining a second pair of lateral pockets coupled to said cursor means and said movable part, respectively, in opposition to the pockets of the first-mentioned pair, the pockets of the second pair being arranged to expand and contract in opposition to the corresponding pockets of the first-mentioned pair.

3. Data encoding apparatus comprising a table, a track supported for movement over said table along a first coordinate of the table, a cursor supported for movement over said track along a second coordinate of the table, first code producing means for encoding the position of said cursor with respect to said table in terms of said first coordinate, second code producing means for encoding the position of said cursor with respect to said table in terms of the second coordinate, said second code producing means being separated from said track and having a part located along an end of said said table and fixed with respect to said table and a cooperating slider supported upon a second track parallel to the first-mentioned track and coupled to said cursor by cable means for movement along said fixed part in accordance with and opposite to the movement of said cursor along the first-mentioned track but non-responsive to movement of the first-mentioned track, said cable means comprising a first cable having portions extending along a side of said table and portions defining a pair of lateral pockets coupled to said cursor and said slider respectively and arranged to expand and contract in opposition, and a second cable having portions extending along the opposite side of said table and portions defining a second pair of said pockets coupled to said cursor and said slider opposite to the first mentioned pair, the pockets associated with said cursor being formed by means supported on said track and being movable with said track without affecting the size of the remaining pockets.

References Cited

UNITED STATES PATENTS 2,322,653 6/1943 Mitchell -------------- 178—19

NEIL C. READ, *Primary Examiner.*

THOMAS A. ROBINSON, *Examiner.*